United States Patent
Jennings et al.

(10) Patent No.: US 6,801,953 B2
(45) Date of Patent: ***Oct. 5, 2004

(54) TRUNKING IN STACKED COMMUNICATION DEVICES

(75) Inventors: Kevin Jennings, Dublin (IE); John Hickey, Co. Tipperary (IE); Edele O'Malley, Dublin (IE); Kam Choi, Tring (GB); Ray Beechinor, Dublin (IE)

(73) Assignee: 3Com Corporation, Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/219,743

(22) Filed: Aug. 15, 2002

(65) Prior Publication Data

US 2002/0194386 A1 Dec. 19, 2002

Related U.S. Application Data

(63) Continuation of application No. 09/201,368, filed on Nov. 30, 1998, now Pat. No. 6,463,479.

(30) Foreign Application Priority Data

Nov. 28, 1997 (GB) ............................................. 9725372

(51) Int. Cl.[7] .............................................. G06F 13/00
(52) U.S. Cl. ........................ 709/250; 709/238; 370/401
(58) Field of Search ................................ 709/250, 238; 370/389, 228, 401

(56) References Cited

U.S. PATENT DOCUMENTS

| | | | |
|---|---|---|---|
| 5,327,127 A | | 7/1994 | May et al. |
| 5,610,905 A | | 3/1997 | Murthy et al. |
| 5,872,781 A | | 2/1999 | Bennet et al. |
| 5,905,873 A | | 5/1999 | Hartmann et al. |
| 5,983,282 A | | 11/1999 | Yucebay |
| 6,006,275 A | | 12/1999 | Picazo, Jr. et al. |
| 6,058,116 A | * | 5/2000 | Hiscock et al. ............. 370/401 |
| 6,088,330 A | * | 7/2000 | Bruck et al. ................ 370/228 |
| 6,108,702 A | | 8/2000 | Wood |
| 6,175,868 B1 | | 1/2001 | Lavian et al. |
| 6,175,875 B1 | | 1/2001 | Stapleton et al. |
| 6,195,351 B1 | * | 2/2001 | Hiscock et al. ............. 370/389 |
| 6,425,015 B1 | * | 7/2002 | Jennings et al. ............ 709/238 |
| 6,463,479 B1 | * | 10/2002 | Jennings et al. ............ 709/250 |

FOREIGN PATENT DOCUMENTS

| | | |
|---|---|---|
| WO | WO 95/03659 | 2/1995 |
| WO | WO 98/04066 | 1/1998 |

\* cited by examiner

*Primary Examiner*—John Follansbee
*Assistant Examiner*—Jungwon Chang
(74) *Attorney, Agent, or Firm*—McDonnell Boehnen Hulbert & Berghoff LLP

(57) ABSTRACT

Trunking or other relationship is defined between ports on different devices in a cascade-connected stack of network devices. When network communications are passed via the cascade connection an indication is included of whether it originated from a port that is part of a trunk and thereby port-mismatch errors can be avoided.

12 Claims, 1 Drawing Sheet

TRUNKING IN STACKED COMMUNICATION DEVICES

BACKGROUND OF THE INVENTION

1. Field of the Invention

The present invention relates to computer networks and in particular to communication devices by way of which computers are connected together to form such networks.

2. The Prior Art

It is well known to form computer networks comprising a number of computers connected together to enable them to communicate with each other. One well known way of connecting computers together is to provide communication devices having a plurality of ports, to each of which a computing device may be connected. The communication device provides for redistribution of communications received on its ports to the computing devices connected to the other ports.

One particular type of communications device is a repeater. A repeater simply retransmits any communication received on any port to each of its other ports thereby ensuring that each of the computing devices connected to the network receive all communications, enabling them to decide whether the communication is intended for them or not. Other types of communication devices include devices known as bridges, which contain some processing capacity so that packets should only be retransmitted on ports necessary to enable those packets to reach their intended destinations. The present invention is applicable to all these types of communication devices but will be described in the context of bridges.

In a practical implementation, a bridge is generally contained in an enclosure or box, which also carries the external connections or ports to which the computing devices forming the network can be connected. For example there may be eight, sixteen or twenty-four ports provided on the device and the bridge is formed in a known manner on a circuit board also including the necessary management processing power to enable the bridge to function as intended.

More recently, it has been recognized as desirable to enable the connection of two or more such devices together to increase the number of ports available at a particular location. This is commonly referred to as connecting the devices in a stack or cascade connection of the devices. Advantages of cascade connection of communication devices include the possibility of upgrading existing equipment to provide a greater number of ports without having to discard the existing equipment, and the provision of more ports in a particular location than may be available on a standard piece of equipment.

Cascade connection between communication devices is typically achieved by providing a cascade or backbone link between the stacked devices. This connection may be made by way of one or two of the ports already provided on the devices for connection to computing devices in the network, alternatively there may be a separate port especially provided for the cascade link. It will be appreciated that, in the basic operation of a repeater, all communications received on any port by one of the devices in the stack will be repeated to the cascade connection in addition to the other ports thereby enabling it to be received by the other devices in the stack and repeated on out of the other ports on those devices. In a bridge arrangement, a received communication is transmitted via the cascade connection if this is necessary to enable the communication to reach its intended destination.

However, other functions that have been provided within a single communications device present certain difficulties for implementation in a stack. In particular, it has been known to implement a feature known as "Trunking". In trunking, a single computing device is connected to a communication device, such as a bridge, using a plurality of connections to a corresponding plurality of ports. The advantage of doing this is that it increases the bandwidth available for communication by the computing device concerned and there is some resilience in the connection; that is, a fault may develop on one of the connections between the computing device and the device but this would not totally disconnect the computing device from the network.

In a simple implementation of a communication device such a dual connection to a communication device would cause port mismatch errors generated when a device receives communications from the same computing device on different ports, which obviously would not occur in the simple implementation of each computer being connected to a single port. The occurrence of such errors can be dealt with within a single device in which the management in the device can associate two or more ports together as a single trunk connection from which it expects communications from a single computing device.

When a stack of communicating devices is provided it may be the case that the two or more connections forming a trunk from a particular computing device may not all be connected to the same physical device in the stack. This may simply be because a user of a network treats the stack of devices as a single entity to which connections can be made freely as in the case of a single device. Further however it is advantageous to be able to connect the different connections forming a trunk to separate physical devices as this provides further resilience in the connection, enabling one of the communication devices to fail without disconnecting the trunked device from the network altogether.

If a trunk is simply connected in this way with the different connections forming the trunk connected to different boxes in the stack each box will potentially receive communications packets from the trunked device both via their own direct connection to that device and via the cascade port. Within the management provided in each box it is not possible simply to define the cascade port as one of the ports included in the trunk because the cascade port will actually carry communications from a large number of different communication devices connected to the stack overall. It is not necessarily the case therefore that all communications appearing on the cascade connection will be part of the trunk, and if the cascade port were simply defined as part of the trunk, port mismatch errors would be generated when communications from other sources were received.

SUMMARY OF THE INVENTION

The present invention provides communications apparatus for a computer network in which a plurality of network devices are enabled to communicate with each other, the apparatus comprising:

a plurality of communication devices each having a plurality of ports via which network communications may be received and transmitted and a communication core means arranged to re-transmit network communications received at said ports according to a defined functionality; and interconnection means arranged to interconnect said communication devices such that network communications received at each communication device may be transmitted to the or each other communication device;

each said communication device comprising management means arranged to transmit, together with each network communication transmitted to said interconnection means, an indication of whether said network communication has been received at a port which has a predetermined relationship with a port in another communication device, and to read said indications received together with network communications received from said interconnection means.

In a preferred embodiment the predetermined relationship is that ports form a trunk and thus the invention enables efficient implementation in a stack of communication devices of trunking which has previously been implemented within a single communications device, as discussed above.

To achieve this, the apparatus and method of the present invention uses a protocol for communications on the cascade connection different from that used in the network as a whole. In particular, communications packets sent via the cascade connection have one or more bits added to them, which extra bits convey information about the packet being transmitted from one communication device in the stack to another. On receipt of a communications packet via the cascade connection, a communication device act on the information provided and will remove the extra bits before retransmission onto the rest of the network to ensure compliance with the overall network protocol.

In the context of trunking as discussed above, the present invention can provide trunking via ports on different boxes within their stack by including with a packet, when it is transmitted on the cascade connection, an indication of which trunk the packet came from, enabling the other communication devices in the stack to take account of this.

BRIEF DESCRIPTION OF THE DRAWINGS

Other features and advantages of the present invention will be understood from the following description of an exemplary embodiment, which is given in conjunction with the accompanying figures, in which.

DETAILED DESCRIPTION OF THE DRAWINGS

In this invention, trunking or other relationship is defined between ports on different devices in a cascade-connected stack of network devices. When network communications are passed via the cascade connection an indication is included of whether it originated from a port that is part of a trunk and thereby port-mismatch errors can be avoided.

Figure 1:
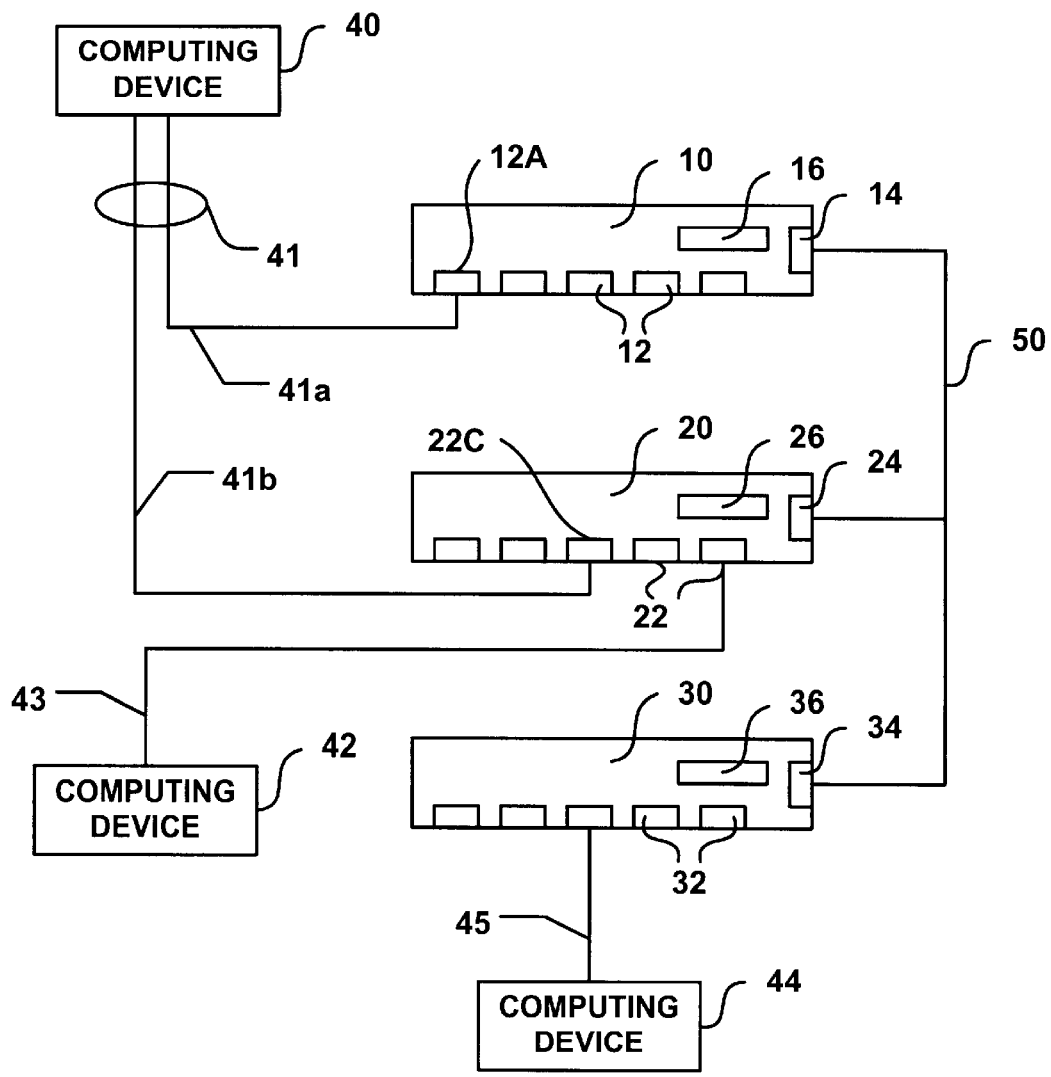
FIG. 1 is a schematic illustration of an embodiment of the present invention.

FIG. 1 illustrates, in schematic form, a simplified computer network useful for understanding the embodiment of the present invention. Broadly, FIG. 1 illustrates three stacked communication devices 10, 20, 30 linked by a cascade connection 50 and to which a number of computing devices 40, 42, 44 are connected. Clearly, in a practical implementation there would be many more computing devices connected to the network but these have been omitted for clarity as they are not essential for understanding the present embodiment.

In more detail, the stack or cascade illustrated in FIG. 1 comprises three communication devices 10, 20, 30. Each of these has a number of ports 12, 22, 32 to which computing devices forming the network can be connected. Each communications device in the stack also has a cascade port 14, 24, 34 and these ports are connected together by way of cascade connection 50. Each communications device further comprises control means 16, 26, 36, which controls the operation of the overall device according to a defined functionality and provides known management functions as required.

If the communication devices function as bridges, the control means functions such that any communication received on any one of ports 12 by for example communication device 10, will be retransmitted from cascade port 14 in addition to others of ports 12, if this is necessary to enable the communication to reach its intended destination or destinations. This will mean that the communication in question will reach communication devices 20 and 30 via cascade ports 24 and 34 enabling those communication devices to retransmit the communication via ports 22, 32. If the communication devices are repeaters, the control means provides the repeater function in the stack in a corresponding fashion.

In FIG. 1 there are illustrated three computing devices 40, 42 and 44 connected to the stack of communication devices by way of links 41, 43, 45 respectively. It will be seen that each of computing devices 42 and 44 is connected to a single port in the stack by way of simple connections 43, 45. Computing device 40 is connected to the stack of communication devices by way of a trunk 41 comprising two links 41a; 41b connected to port 12a on communication device 10 and port 22c on communication device 20. As mentioned above, this trunking arrangement increases the bandwidth available for communication by computing device 40.

As mentioned above, control means 16, 26, 36 provide some management processing. This, among other functions, monitors which computing devices are attached to which ports. It is possible to do this by monitoring the communications received on each port each of which will specify the source address. If it appears that the same computing device is connected to more than one port on a communication device, a port mismatch error will normally be generated within the control means to indicate that some misconfiguration of the network has occurred. An exception to this is made in the situation where trunking is defined and this is a special arrangement which permits communications to be received from a single computing device on a designated plurality of ports. Such a simple implementation is not possible when a trunk is distributed across stack as illustrated in FIG. 1.

As illustrated, link 41a forming part of trunk 41 is connected to port 12a of box 10. Communications originating at computing device 40 will therefore be seen by control means 16 in box 10 at port 12a and port 12a will be associated with computing device 40. The other link 41b forming part of trunk 41 is connected to port 22c of device 20. These communications may be retransmitted on the cascade 50 via port 24 and therefore received by box 10 at port 14. Control means 16 in box 10 therefore may see communications originating at computing device 40 also at cascade port 14. It is not possible, within control means 16, simply to define the trunk as comprising port 12a and 14 in the same way as would be possible if both links of the trunk were connected to ones of ports 12 on box 10. This is because control means 16 in box 10 will also see on cascade port 14 communications originating at computing device 42 transmitted onto the cascade connection via port 24 and computing device 44 transmitted onto the cascade via port 34. If port 14 was simply designated as part of the trunk this would cause many more port mismatch errors to occur.

In the described embodiment of the present invention, this potential for errors is removed by way of sending extra information concerning the packet in question with the packet when it is transmitted by the cascade link 50. As mentioned above, in the present invention, additional data bits may be added to each communications packet that is transmitted via cascade 50 to transmit information to other communication devices in the stack, which then remove these additional data bits before retransmission of the packet on to the remainder of the network. This is explained in more detail in the following.

Figure 2A:
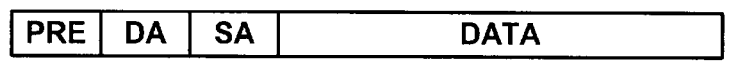
FIGS. 2A–2B illustrates the construction of a data packet in the preferred embodiment of the invention.

FIG. 2A illustrates the formation of a data packet in accordance with known network protocols such as Ethernet. The packet starts with a preamble (PRE) that carries no information but comprises a number of bits in a predetermined or pseudo random form enabling proper detection of and synchronisation with a packet which is being received. The packet also includes destination address (DA) and source address (SA) fields that identify the intended destination of the packet and its originator, and the data field that carries the actual data conveyed by the data packet. Various well known protocols define the presence of fields additional to those illustrated in FIG. 2A, but these are omitted here as FIG. 2A is simply to illustrate the general format of a data packet. However, it should be noted that within a network, all data packets must conform strictly to the pattern defined by the protocol under which the network is working to enable proper functioning of the network.

However, as mentioned above, additional data is added to each packet that is transmitted via a cascade link, and therefore effectively a local variation on the network protocol is established within the cascade-connected stack.

Figure 2B:

In particular, in the present embodiment an extra field (TRU) is added to each communications packet transmitted via the cascade as illustrated in FIG. 2B. This indicates if the packet in question has arrived at the stack on a port which forms part of a trunk connection and, if so, which trunk. As illustrated the TRU field is inserted immediately ahead of the DA field. This is merely by way of example and the TRU field may be inserted at any appropriate position within the data packet. The insertion and removal of the TRU field is controlled by control means 16, 26, 36 which act to insert a TRU field in each packet transmitted via the cascade connection and to read and remove the TRU field from each packet received from the cascade connection. Packets being transmitted within the stack are therefore all of the form illustrated in FIG. 2B, but all packets transmitted to the network via ports 12, 22, 42 are of the form illustrated in FIG. 2A and therefore conform to the general network protocol.

In configuring the stack, control means 16 within box 10 has defined therein the presence of trunk connection 41 to computing device 40 with the information that one of the connections forming this trunk is to port 12a. It additionally has the information that it is possible for additional communications in trunk 41 to be received on cascade port 14.

Correspondingly, control means 26 within box 20 has defined therein the presence of trunk connection 41 with the information that one of the connections forming this trunk is to port 22c while additional communications in the trunk may be received via cascade connection 24.

Accordingly, when computing device 40 sends a communication in the form of FIG. 2A via link 41b this is received by box 20 at port 22c. Control means 26 acts to re-transmit the packet in its received form via others of ports 22, and also in the form of FIG. 2B via cascade connection 24. In particular, for retransmission via cascade connection 24 control means 26 adds a TRU field to the packet identifying the packet as one which is received from trunk 41.

When the modified packet is received at port 14 of box 10, control means 16 reads and removes the TRU field. The removal of the TRU field means that the packet is re-transmitted via ports 12 in its original FIG. 2A format according to the network protocol. Upon reading the TRU field, control means 16 determines that the packet is one which has been received by the stack from trunk 41 and therefore the fact that the SA field identifies the same source as the SA fields in packets received at port 12a is not taken to indicate a port mis-match.

In contrast, when the modified packet mentioned above is received at port 34 of box 34 and control means 36 reads and removes the TRU field, control means 36 determines that it is a packet received via a trunk which is not directly linked to box 30, and therefore the packet, with the TRU field removed, is treated in the usual way.

By way of further contrast, consider a packet received by box 20 from computing device 42 by way of link 43. This packet is in the format of FIG. 2A and is re-transmitted in this form via others of ports 22. However, for transmission via the stack in this embodiment, the packet must have the format of FIG. 2B in order to conform to the local protocol in cascade 50. Control means 26 therefore inserts a TRU field that indicates that the packet was not received via a trunk connection and transmits the modified packet to the cascade 50.

Upon receipt of this modified packet at ports 14 and 34, control means 16 and 36 remove and read the TRU field. There is, however, no specific action to take as the packet is not from a trunk connection and the packet is re-transmitted in its original FIG. 2A format via ports 12 and 32.

This arrangement is therefore different from the prior art, which would simply define cascade port 14 as one of the trunked ports because in that arrangement it would not be possible to receive communications from any other source via cascade port 14. Rather, in the present embodiment, control means 16 in box 10 is aware of the acceptability of receiving communications associated with this trunk via cascade port 14 to avoid generating port mismatch errors on port 12a.

It will be seen that this embodiment provides advantages in terms of enabling implementation of a trunk comprising a number of communication links connected to ports on different boxes in a stack of communication devices which would not be possible in the prior art configuration.

We claim:

1. Communication apparatus for a computer network employing addressed data packets, comprising:

a stack of communication devices each of which has a multiplicity of ports for forwarding data packets to said computer network and receiving data packets from said computer network;

a cascade connection which is connected to at least one cascade port of each of said communication devices, said cascade connection providing transmission of data packets between the communication devices; and at least one trunk connection, constituted by a plurality of links for the sending of addressed data packets, each of said links extending from a further communication device to a respective port in a set of ports, other than any cascade port, the ports in said set of ports being located on more than one communication device in said stack; whereby a communication device in said stack can receive data packets both directly from said further communication device and also indirectly from said further communication device by way of said cascade connection; and wherein each communication device transmits on the cascade connection addressed packets with a respective indication whether said addressed data packets have been received at a port in the trunk connection and each communication device is arranged for responding to such an indication received with addressed data packets from said cascade connection whereby to recognize such addressed packets as coming from said further communication device by way of said trunk.

2. Communication apparatus according to claim 1 wherein each communication device inserts said indication as an extra field into a respective packet prior to the transmission of the respective packet on the cascade connection and reads and removes such a field from a packet received from the cascade connection.

3. Communication apparatus according to claim 2 wherein said extra field indicates from which trunk connection the respective packet has been received by said respective port.

4. Communication apparatus comprising a stack of communication devices, each of which includes a respective multiplicity of ports for receiving and forwarding addressed data packets, the communication apparatus also including a cascade connection which is connected to at least one cascade port of each of the communication devices, wherein:

each communication device is arranged to receive packets that are destined for forwarding from a port of another communication device in the stack, said received packets being received at a port in the respective multiplicity, and said communication device being arranged to transmit the packets on the cascade connection;

each communication device includes control means which can define at least one selected port in the respective multiplicity as a member of a trunk connection;

each communication device is arranged to insert into data packets which it transmits on the cascade connection a field which indicates whether those packets have been received at a port defined as a member of a trunk connection; and each communication device is arranged to respond to such a field in data packets that it receives from the cascade connection and to remove such a field from those data packets.

5. Communication apparatus according to claim 4 wherein said field identifies said trunk connection.

6. Communication apparatus according to claim 4 wherein each packet includes a destination address and said field is inserted before the destination address.

7. Communication apparatus comprising at least a first communication device and a second communication device, both of which includes a respective multiplicity of ports for receiving and forwarding addressed data packets, the communication apparatus also including a cascade connection which is connected to at least one cascade port of both said first communication device and said second communication device, wherein:

said first communication device is arranged to transmit on the cascade connection addressed data packets received by said first communication device at a port in the respective multiplicity and which are destined for forwarding from a port of said second communication device;

at least one of said first and second communication devices inserts in data packets a field which indicates whether those packets have been received at a port which is defined as a member of a trunk connection and transmits the packets on the cascade connection; and the other of said first and second communication devices reads said field in data packets that it receives from the cascade connection and removes said field before the packets are forwarded from any port in that device's respective multiplicity of ports.

8. Communication apparatus according to claim 7 wherein said field identifies said trunk connection.

9. A communication device capable of operation in a stack of communication devices including a cascade connection and comprising:

a multiplicity of ports for receiving and forwarding addressed data packets;

at least one cascade port for coupling said communication device to said cascade connection; and control means which:
(a) modify addressed data packets transmitted from the at least one cascade port by the insertion of a field adapted to indicate whether the packet has arrived on a port which forms part of a trunk connection; and
(b) read, and remove, any such field in addressed data packets received by way of said at least one cascade port.

10. Communication apparatus according to claim 9 wherein said field identifies said trunk connection.

11. A communication device capable of operation in a stack of communication devices including a cascade connection and comprising:

a multiplicity of ports each for receiving and forwarding addressed data packets;

at least one cascade port for coupling said communication device to said cascade connection; and control means which:
(a) cause the transmission to the at least one cascade port of addressed data packets which the device receives at a port in the multiplicity and which are according to address data in the packets are destined for forwarding from another communication device in the stack;
(b) define at least a selected port in said multiplicity as a member of a trunk connection;
(c) modify addressed data packets by the insertion of a field adapted to indicate whether the packet has arrived at such a selected port;
(d) read, and remove, any such field in addressed data packets received by way of said at least one cascade port.

12. Communication apparatus according to claim 11 wherein said field identifies said trunk connection.

* * * * *